(12) United States Patent  (10) Patent No.: US 11,794,590 B2
Hwang et al.  (45) Date of Patent: Oct. 24, 2023

(54) APPARATUS FOR CONTROLLING MOTOR OF A VEHICLE AND METHOD THEREOF

(71) Applicants: HYUNDAI MOTOR COMPANY, Seoul (KR); KIA CORPORATION, Seoul (KR)

(72) Inventors: Sung Wook Hwang, Seoul (KR); Seung Ki Kim, Suwon-si (KR); Sang Ho Lee, Seoul (KR); Jae Il Park, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 102 days.

(21) Appl. No.: 17/366,529

(22) Filed: Jul. 2, 2021

(65) Prior Publication Data

US 2022/0080838 A1  Mar. 17, 2022

(30) Foreign Application Priority Data

Sep. 11, 2020  (KR) .......................... 10-2020-0116882

(51) Int. Cl.
  *B60L 15/20*  (2006.01)
  *B60W 10/08*  (2006.01)
  (Continued)

(52) U.S. Cl.
  CPC .......... *B60L 15/2036* (2013.01); *B60W 10/08* (2013.01); *B60W 10/192* (2013.01);
  (Continued)

(58) Field of Classification Search
  CPC .. B60L 15/2036; B60L 15/20; B60L 2240/42; B60W 10/08; B60W 10/192; B60W 30/04; B60W 30/18145; B60W 2520/10; B60W 2520/125; B60W 2520/14; B60W 2520/18; B60W 2520/263; B60W 2710/083; B60W 2030/041; B60W 2030/043; B60W 30/045;
  (Continued)

(56) References Cited

U.S. PATENT DOCUMENTS

2013/0144476 A1\* 6/2013 Pinto .................... B60T 8/17555
  903/930
2013/0179015 A1\* 7/2013 Liang .................... B60T 8/1755
  701/22

(Continued)

OTHER PUBLICATIONS

An Integrated Control of Differential Braking, Front/Rear Traction, and Active Roll (Year: 2016).\*

*Primary Examiner* — Jeff A Burke
*Assistant Examiner* — Kyle T Johnson
(74) *Attorney, Agent, or Firm* — MORGAN, LEWIS & BOCKIUS LLP

(57) ABSTRACT

A vehicle motor control apparatus includes: a processor configured to determine whether a state of a vehicle is an over-steer state or an under-steer state, to determine a driving control mode or a braking control mode of a motor based on a determination result of the state of the vehicle, to calculate a target yaw moment of based on a tire force by using the over-steer state or the under-steer state, and to determine a motor control amount that follows the target yaw moment; and a storage configured to store data and algorithms driven by the processor.

18 Claims, 17 Drawing Sheets

(51) Int. Cl.
  *B60W 10/192* (2012.01)
  *B60W 30/04* (2006.01)
  *B60W 30/18* (2012.01)
(52) U.S. Cl.
  CPC ...... *B60W 30/04* (2013.01); *B60W 30/18145* (2013.01); *B60W 2520/10* (2013.01); *B60W 2520/125* (2013.01); *B60W 2520/14* (2013.01); *B60W 2520/18* (2013.01); *B60W 2520/263* (2013.01)
(58) Field of Classification Search
  CPC . B60W 2050/0008; B60W 2050/0033; B60W 2510/207; B60W 40/101; B60W 2520/16; B60W 2540/18; B60W 2720/14; B60W 2720/403; B60W 10/18; B60W 40/109; B60W 40/112; B60W 40/114; B60W 40/12; B60W 2050/0005; B60W 2050/0022; B60W 2520/26; B60K 1/00; B60K 2001/001; B60K 6/52; B60K 1/02; B60K 7/0007; B60Y 2200/91; B60Y 2200/92; B60Y 2300/0223; B60Y 2300/045; B60Y 2300/1815; Y02T 10/64; Y02T 10/72; Y02T 90/40
  See application file for complete search history.

(56) References Cited

U.S. PATENT DOCUMENTS

| | | | |
|---|---|---|---|
| 2015/0066243 A1* | 3/2015 | Hirao | B60W 40/13 701/1 |
| 2015/0100205 A1* | 4/2015 | Katsuyama | B60W 30/045 701/37 |
| 2015/0120106 A1* | 4/2015 | Yu | B60W 30/02 701/22 |
| 2016/0159225 A1* | 6/2016 | Nakatsu | B60L 15/2009 701/70 |
| 2017/0166203 A1* | 6/2017 | Sugai | B60T 8/17 |
| 2017/0232848 A1* | 8/2017 | Lian | B60W 30/18172 701/22 |
| 2018/0194357 A1* | 7/2018 | Hall | B60W 50/14 |
| 2019/0135262 A1* | 5/2019 | Gaither | B60W 20/10 |
| 2020/0353977 A1* | 11/2020 | Davies | B62D 7/18 |
| 2021/0107457 A1* | 4/2021 | Kamischke | B60W 10/18 |
| 2021/0229704 A1* | 7/2021 | Zhu | B60W 50/10 |
| 2022/0080838 A1* | 3/2022 | Hwang | B60K 1/00 |
| 2022/0080953 A1* | 3/2022 | Hwang | B60W 30/045 |

* cited by examiner

APPARATUS FOR CONTROLLING MOTOR OF A VEHICLE AND METHOD THEREOF

CROSS-REFERENCE TO RELATED APPLICATION

This application claims priority to and benefits of Korean Patent Application No. 10-2020-0116882 filed in the Korean Intellectual Property Office on Sep. 11, 2020, the entire contents of which are incorporated herein by reference.

TECHNICAL FIELD

The present disclosure relates to a vehicle motor control apparatus and a vehicle motor control method, and more particularly, to a technique for calculating and applying a motor control amount in consideration of handling performance (oversteer or understeer) of an electric vehicle.

BACKGROUND

The eco-friendly vehicles include an electric vehicle that includes a battery which is a rechargeable power supply and a motor. Such an electric vehicle rotates the motor with electricity accumulated in the battery, and drives wheels by using rotation of the motor. The eco-friendly vehicles further include a hybrid vehicle and hydrogen fuel cell vehicles. The hybrid vehicle includes an engine, a battery, and a motor, and controls mechanical power of the engine and electrical power of the motor to drive wheels.

As such, a vehicle equipped with a motor includes motors for driving front and rear wheels, respectively, to drive the motors by determining a control amount of each of the motors based on a vehicle speed, a steering angle, and a lateral jerk.

Previously, turning responsiveness and stability were not considered for torque control by determining a motor control amount without considering handling performance.

The above information disclosed in this Background section is only for enhancement of understanding of the background of the disclosure, and therefore, it may contain information that does not form the prior art that is already known in this country to a person of ordinary skill in the art.

SUMMARY

An exemplary embodiment of the present disclosure has been made in an effort to provide a vehicle motor control apparatus and a vehicle motor control method capable of improving turning responsiveness and stability by performing torque control of front and rear wheel motors for each turning situation or for each turning phase.

In addition, an exemplary embodiment of the present disclosure is to provide a vehicle motor control apparatus and a vehicle motor control method capable of calculating a motor control amount that satisfies a tire force computed by calculating a target yaw moment based on cornering stiffness.

The technical objects of the present disclosure are not limited to the objects mentioned above, and other technical objects not mentioned can be clearly understood by those skilled in the art from the description of the claims.

An exemplary embodiment of the present disclosure provides a vehicle motor control apparatus, including: a processor configured to determine whether a vehicle is in an over-steer state or an under-steer state, to determine a driving control mode or a braking control mode of a motor depending on the state of the vehicle, to calculate a target yaw moment of based on a tire force by using the over-steer state or the under-steer state, and to determine a motor control amount that follows the target yaw moment; and a storage configured to store data and algorithms driven by the processor.

In an exemplary embodiment, the processor may determine the state of the vehicle based on at least one of a vehicle speed, a steering angle, a lateral jerk, a yaw rate, and a lateral slip angle.

In an exemplary embodiment, the processor may calculate a target yaw rate based on the vehicle speed and the steering angle, and calculating an under-steer index or an over-steer index by combining a yaw rate error value, which is a difference between the target yaw rate and a current yaw rate, and a front wheel lateral slip angle and a rear wheel lateral slip angle.

In an exemplary embodiment, the processor may perform driving control or braking control of a single motor depending on the target yaw moment in a vehicle having the single motor.

In an exemplary embodiment, the processor, in a vehicle having at least two or more motors, may perform driving control or braking control of a first motor depending on the target yaw moment, and may perform driving control or braking control of a second motor by using a roll state amount and a pitch state amount.

In an exemplary embodiment, the processor may perform braking control of a rear wheel motor when the vehicle is in the under-steer state and performs driving control of a front wheel motor when a pitch and roll rate exceed a predetermined threshold value.

In an exemplary embodiment, the processor may perform driving control of a front wheel motor when the vehicle is in the over-steer state and performs braking control of a rear wheel motor when a pitch and roll rate exceed a predetermined threshold value.

In an exemplary embodiment, the processor may calculate the target yaw moment for a yaw rate error by using a bicycle model and a sliding mode control (SMC), and calculates the target yaw moment based on cornering stiffness that is available in a general driving area and a limit area, which is a tire nonlinear section.

In an exemplary embodiment, the processor may develop the target yaw moment as a formula based on a tire force of a vehicle model, may calculate a vertical force of each tire based on a vehicle dynamics model, may calculate a tire lateral force by using the vertical force of each of the tires, and may calculate a tire driving torque based on the tire lateral force.

In an exemplary embodiment, the processor may calculate the motor control amount by using the tire driving torque, a motor rotational speed, and a vehicle speed.

In an exemplary embodiment, the processor may finally determine the motor control amount by computing a weight reflecting the motor control amount, vertical acceleration, which is a control factor of pitch performance, and lateral acceleration, which is a control factor of roll performance, with the target yaw moment.

An exemplary embodiment of the present disclosure provides a vehicle motor control method, including: determining whether the vehicle is in an over-steer state or an under-steer state; determining a driving control mode or a braking control mode of a motor depending on the state of the vehicle; controlling the motor depending on the determined control mode; calculating a target yaw moment based on a tire force by using the over-steer state or the under-steer state; and determining a motor control amount that follows the target yaw moment.

In an exemplary embodiment, the determining of whether the vehicle is in the over-steer state or the under-steer state may include calculating a target yaw rate based on the vehicle speed and the steering angle, and calculating an under-steer index or an over-steer index by combining a yaw rate error value, which is a difference between the target yaw rate and a current yaw rate, and a front wheel lateral slip angle and a rear wheel lateral slip angle.

In an exemplary embodiment, the controlling of the motor may include performing driving control or braking control of a single motor depending on the target yaw moment in a vehicle having the single motor.

In an exemplary embodiment, the controlling of the motor may include, in a vehicle having at least two or more motors, performing driving control or braking control of a first motor depending on the target yaw moment; and performing driving control or braking control of a second motor by using a roll state amount and a pitch state amount.

In an exemplary embodiment, the controlling of the motor may include performing braking control of a rear wheel motor when the vehicle is in the under-steer state and performs driving control of a front wheel motor when a pitch and roll rate exceed a predetermined threshold value.

In an exemplary embodiment, the controlling of the motor may include performing driving control of a front wheel motor when the vehicle is in the over-steer state and performs braking control of a rear wheel motor when a pitch and roll rate exceed a predetermined threshold value.

In an exemplary embodiment, the calculating of the target yaw moment based on the tire force may include: developing the target yaw moment as a formula based on a tire force of a vehicle model; calculating a vertical force of each tire based on a vehicle dynamics model; calculating a tire lateral force by using the vertical force of each of the tires; and calculating a tire driving torque based on the tire lateral force.

In an exemplary embodiment, the determining of the motor control amount that follows the target yaw moment may include calculating the motor control amount by using the tire driving torque, a motor rotational speed, and a vehicle speed.

In an exemplary embodiment, the determining of the motor control amount that follows the target yaw moment may include finally determining the motor control amount by computing a weight reflecting the motor control amount, vertical acceleration, which is a control factor of pitch performance, and lateral acceleration, which is a control factor of roll performance, with the target yaw moment.

According to the present technique, it is possible to improve turning responsiveness and stability by performing torque control of the front and rear wheel motors for each turning situation or for each turning phase.

In addition, various effects that can be directly or indirectly identified through this document may be provided.

DETAILED DESCRIPTION OF THE EMBODIMENTS

Figure 1:
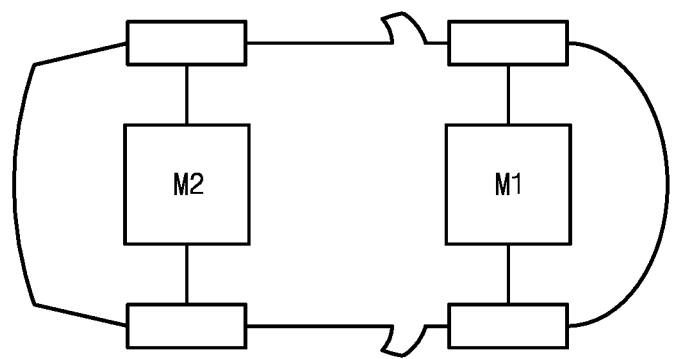
FIG. 1 illustrates a schematic diagram of a front wheel motor and a rear wheel motor according to an exemplary embodiment of the present disclosure.

Hereinafter, some exemplary embodiments of the present disclosure will be described in detail with reference to exemplary drawings. It should be noted that in adding reference numerals to constituent elements of each drawing, the same constituent elements have the same reference numerals as possible even though they are indicated on different drawings. In addition, in describing exemplary embodiments of the present disclosure, when it is determined that detailed descriptions of related well-known configurations or functions interfere with understanding of the exemplary embodiments of the present disclosure, the detailed descriptions thereof will be omitted.

In describing constituent elements according to an exemplary embodiment of the present disclosure, terms such as first, second, A, B, (a), and (b) may be used. These terms are only for distinguishing the constituent elements from other constituent elements, and the nature, sequences, or orders of the constituent elements are not limited by the terms. In addition, all terms used herein including technical scientific terms have the same meanings as those which are generally understood by those skilled in the technical field to which the present disclosure pertains (those skilled in the art) unless they are differently defined. Terms defined in a generally used dictionary shall be construed to have meanings matching those in the context of a related art, and shall not be construed to have idealized or excessively formal meanings unless they are clearly defined in the present specification.

Hereinafter, exemplary embodiments of the present disclosure will be described in detail with reference to FIG. 1 to FIG. 15.

Figure 2:
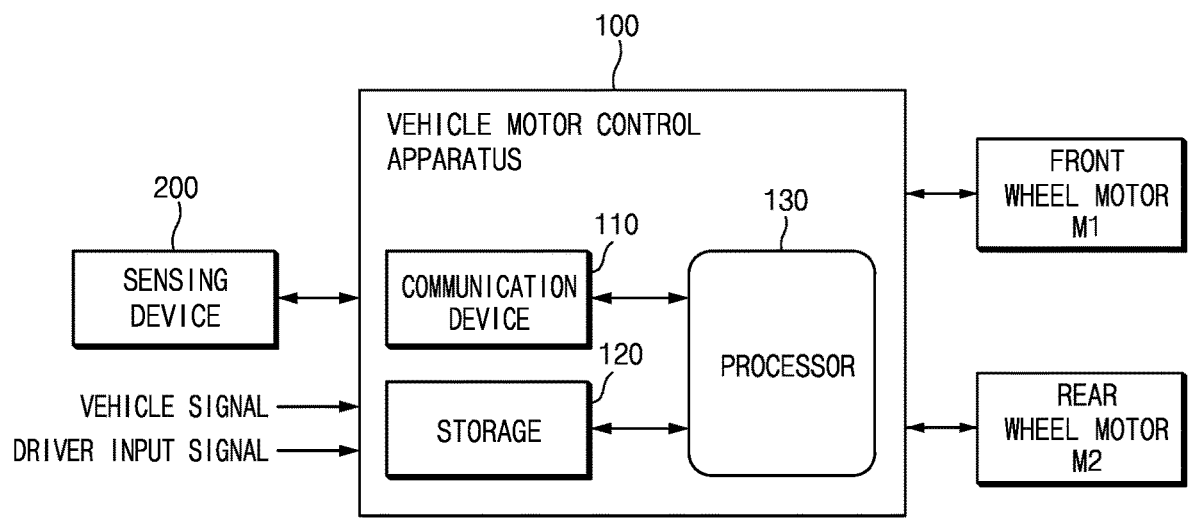
FIG. 2 illustrates a block diagram showing a configuration of a vehicle system including a vehicle motor control apparatus according to an exemplary embodiment of the present disclosure.

FIG. 1 illustrates a schematic diagram of a front wheel motor and a rear wheel motor according to an exemplary embodiment of the present disclosure, and FIG. 2 illustrates a block diagram showing a configuration of a vehicle system including a vehicle motor control apparatus according to an exemplary embodiment of the present disclosure.

Referring to FIG. 1, a front wheel motor M1 for driving a front wheel of a vehicle and a rear wheel motor M2 for driving a rear wheel are provided.

Referring to FIG. 2, according to an exemplary embodiment of the present disclosure, a vehicle system includes a vehicle motor control apparatus 100 implemented inside a vehicle. In this case, the vehicle motor control apparatus 100 may be integrally formed with internal control units (e.g., ECU) of the vehicle, or may be implemented as a separate device to be connected to control units of the vehicle by a separate connection means.

The vehicle system includes the vehicle motor control apparatus 100, a sensing device 200, the front wheel motor M1, and the rear wheel motor M2.

The vehicle motor control apparatus 100 may determine whether the vehicle is in an over-steer state or an under-steer state, may determine a driving control mode or a braking control mode of a motor depending on the state of the vehicle, may calculate a target yaw moment of based on a tire force by using the over-steer state or the under-steer state, and may determine a motor control amount that follows the target yaw moment.

The vehicle motor control apparatus 100 may include a communication device 110, a storage 120, and a processor 130.

The communication device 110 is a hardware device implemented with various electronic circuits to transmit and receive signals, and in the present disclosure, communication may be performed using an in-vehicle network communication technique. Herein, in-vehicle communication may be performed through controller area network (CAN) communication, local interconnect network (LIN) communication, or flex-ray communication as the in-vehicle network communication technique.

As an example, the communication device 110 may communicate with the in-vehicle sensing device 200, the front wheel motor M1, and the rear wheel motor M2. As an example, the communication device 110 may transmit a command value depending on a motor control amount to the front wheel motor M1 and the rear wheel motor M2, and may receive vehicle information sensed by the sensing device 200.

The storage 120 may store sensing results of the sensing device 200, data obtained by the processor 130, data and/or algorithms required for the processor 130 to operate, and the like.

As an example, the storage 120 may store a threshold value for determining an under-steer or over-steer state, a driving torque limit value, etc. previously set depending on an experimental value.

The storage 120 may include a storage medium of at least one type among memories of types such as a flash memory, a hard disk, a micro, a card (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic memory (MRAM), a magnetic disk, and an optical disk.

The processor 130 may be electrically connected to the communication device 110, the storage 120, and the like, may electrically control each component, and may be an electrical circuit that executes software commands, thereby performing various data processing and calculations described below. The processor 130 may be, e.g., an electronic control unit (ECU), a micro controller unit (MCU), or other sub controllers mounted in the vehicle.

The processor 130 may determine an under-steer state, an over-steer state, and lateral motion stability of a vehicle based on at least one of a vehicle speed, a steering angle, a lateral jerk, a yaw rate, and a lateral slip angle. In this case, the vehicle speed, the steering angle, the lateral jerk, the yaw rate, and the lateral slip angle may be received from the sensing device 200 of the vehicle or as a vehicle signal from an in-vehicle device. In this case, the under-steer state of the vehicle indicates tendency of the vehicle to turn less sharply than will of a driver when turning.

The over-steer state of the vehicle indicates a phenomenon in which a turning radius becomes smaller than an angle at which a steering wheel is turned when the vehicle turns at a corner.

Figure 3:
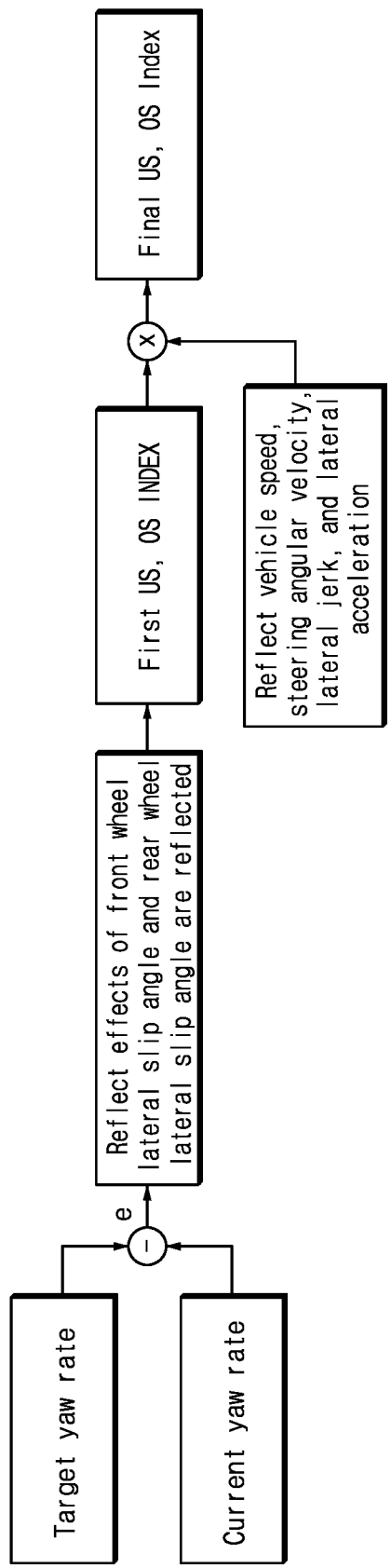
FIG. 3 illustrates a flowchart for describing a vehicle state determining method according to an exemplary embodiment of the present disclosure.

FIG. 3 illustrates a flowchart for describing a vehicle state determining method according to an exemplary embodiment of the present disclosure.

Referring to FIG. 3, the processor 130 calculates a target yaw rate using a vehicle speed, a steering angle, and the like, and calculates a yaw rate error amount "e", which is a difference between the target yaw rate and a current yaw rate.

Subsequently, the processor 130 derives a first under-steer index and an over-steer index of the vehicle by combining estimated lateral slip angles of the front and rear wheels and the yaw rate error amount "e".

The processor 130 calculates a weight factor reflecting a driver's turning will and a driving road surface condition by using at least one of a vehicle speed, a steering angular velocity, a lateral jerk, and a lateral acceleration.

The processor 130 corrects the first under-steer index and the over-steer index of the vehicle by combining weight factors with the first under-steer index and the over-steer index.

Accordingly, the processor 130 outputs the corrected first under-steer index and over-steer index.

The processor 130 may determine a motor control mode for cooperation depending on types of motors installed in a motorized vehicle. Shapes of the motors may be classified into a two-wheel drive or a four-wheel drive. The motor control mode may be divided into a driving control mode and a braking control mode.

A two-wheel drive (2WD) vehicle may use a single motor to improve turning performance with braking torque control or drive torque control while turning.

A four-wheel drive (4WD) vehicle uses a front wheel motor and a rear wheel motor to improve turning performance with a first motor (e.g., rear wheel motor), and performs vehicle body stabilization control with a second motor (e.g., front wheel motor).

Figure 4A:
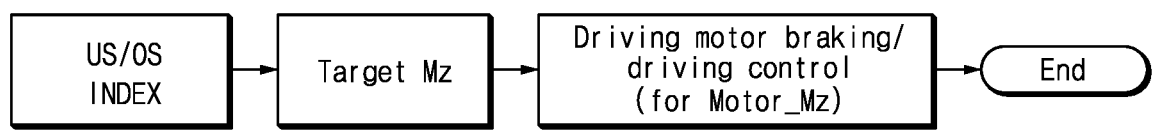
FIG. 4A and FIG. 4B illustrate views for describing a motor control mode determining method depending on a vehicle state according to an exemplary embodiment of the present disclosure.
Figure 4B:
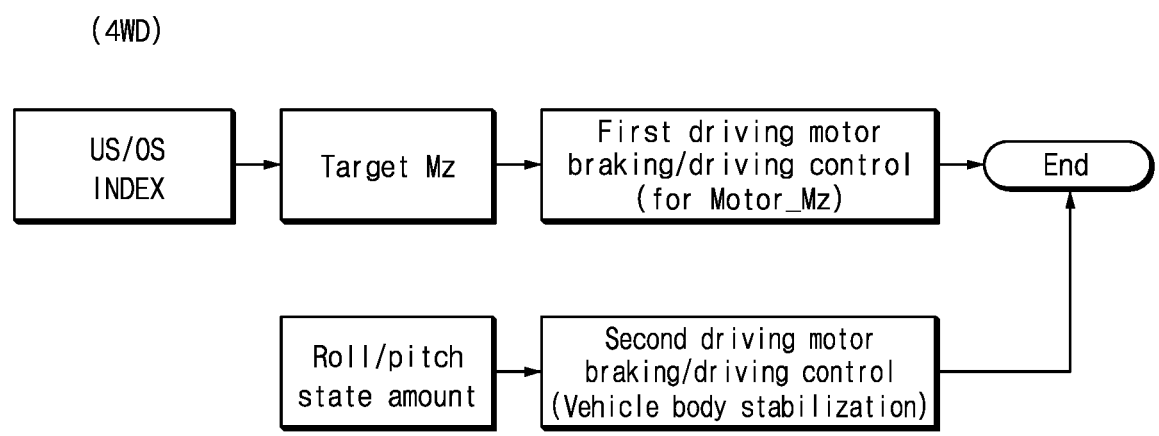

FIG. 4A and FIG. 4B illustrate views for describing a motor control mode determining method depending on a vehicle state according to an exemplary embodiment of the present disclosure.

Referring to FIG. 4A, in the case of a two-wheel drive vehicle, the processor 130 calculate a target yaw moment Mz by using the under-steer index and the over-steer index, and performs braking and driving control of the motor depending on the target yaw moment Mz.

Referring to FIG. 4B, in the case of a four-wheel drive vehicle, the processor 130 calculate a target yaw moment Mz by using the under-steer index and the over-steer index, and performs braking and driving control of the first motor depending on the target yaw moment Mz. In addition, the processor 130 stabilizes the vehicle body by performing braking and driving control of the second driving motor using a roll state amount and a pitch state amount.

Figure 5:
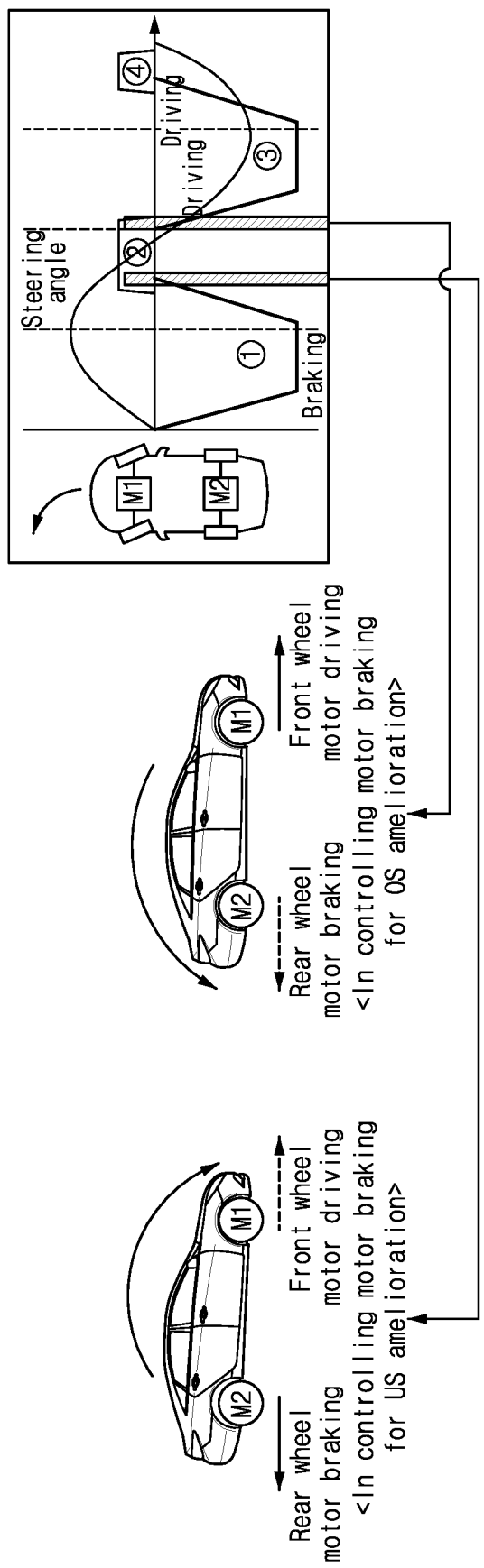
FIG. 5 and FIG. 6 illustrate views for describing a motor control method for improving an under-steer mode and an over-steer mode according to an exemplary embodiment of the present disclosure.
Figure 6:
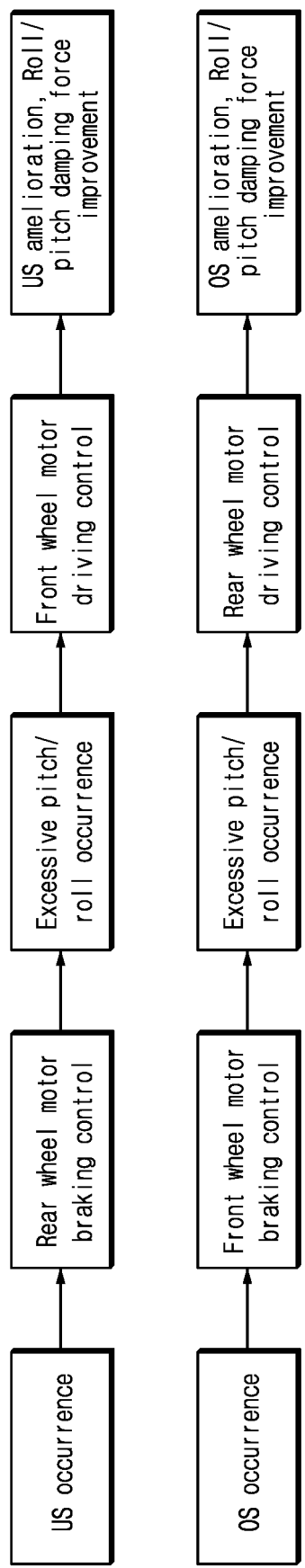

FIG. 5 and FIG. 6 illustrate views for describing a motor control method for improving an under-steer mode and an over-steer mode of the four-wheel drive vehicle according to an exemplary embodiment of the present disclosure.

Referring to FIG. 5, pitch/roll behavior control incidentally occurring during under-steer and over-steer control based on a longitudinal torque of a motor in the four-wheel drive vehicle is performed. That is, the processor 130 performs braking control of the rear wheel motor and driving control of the front wheel motor to ameliorate understeer. In addition, the processor 130 performs driving control of the rear wheel motor and braking control of the rear wheel motor to ameliorate oversteer.

Referring to FIG. 6, the processor 130 may perform braking control of the rear wheel motor when understeer occurs, and may ameliorate understeer and improve a roll/pitch damping force by performing driving control the front wheel motor when a pitch/roll rate caused by the braking control of the rear wheel motor exceeds a threshold value (when excessive pitch/roll occurs).

The processor 130 may perform driving control of the front wheel motor when oversteer occurs and may ameliorate oversteer and improve the roll/pitch damping force by performing braking control of the rear wheel motor when a pitch/roll rate caused by the driving control of the front wheel motor exceeds a threshold value.

As such, the processor 130 may control the front wheel motor and the rear wheel motor at the same time to prevent excessive roll/pitching, may reduce a sense of heterogeneity by applying a braking torque and a driving torque, and may increase a braking control amount and a driving control amount to ameliorate understeer or oversteer. Accordingly, the present disclosure may provide an effect of increasing a vehicle behavior control range.

The processor 130 may determine a motor control amount that satisfies a vehicle target yaw moment based on a handling index.

The processor 130 may determine a motor control amount that satisfies a vehicle target yaw moment based on a handling index. That is, the processor 130 determines a vehicle motion target amount by determining a target yaw moment based on a vehicle model.

To this end, the processor 130 may calculate a target yaw moment for a yaw rate error using sliding mode control (SMC) based on a bicycle model, and may determine the target yaw moment based on cornering stiffness that is available for both a normal driving area and a limit area, which is a tire nonlinear section.

Equation 1 represents a bike model, and Equation 2 represents an equation for calculating yaw moments (Mz, r) based on the bike model.

$$\begin{bmatrix} \dot{\beta} \\ \dot{\gamma} \end{bmatrix} = \begin{bmatrix} \frac{-(C_f + C_r)}{mV_x} & \frac{(-l_f C_f + l_r C_r)}{mV_x^2} - 1 \\ \frac{(-l_f C_f + l_r C_r)}{I_z} & \frac{-(l_f^2 C_f + l_r^2 C_r)}{I_z V_x} \end{bmatrix} \begin{bmatrix} \beta \\ \gamma \end{bmatrix} + \begin{bmatrix} \frac{C_f}{mV_x} & \frac{C_r}{mV_x} \\ \frac{l_f C_f}{I_z} & -\frac{l_r C_r}{I_z} \end{bmatrix} \begin{bmatrix} \delta_f \\ \delta_r \end{bmatrix} + \begin{bmatrix} 0 & \frac{1}{mV_x} \\ \frac{1}{I_z} & 0 \end{bmatrix} \begin{bmatrix} F_y \\ M_z \end{bmatrix}$$ (Equation 1)

Herein, $C_f$ indicates front wheel cornering stiffness, $C_r$ indicates rear wheel cornering stiffness, M indicates vehicle mass, $V_x$ indicates a vehicle speed, and $l_z$ indicates rotational interference in a z-axis direction. $L_f$ indicates a distance from a center of gravity of the vehicle to a center of the front wheel, which represents "a" in FIG. 8A. $L_r$ indicates a distance from a center of gravity of the vehicle to a center of the rear wheel, which represents "b" in FIG. 8A.

$$\dot{\gamma} = \frac{-(l_f^2 C_f + l_r^2 C_r)}{I_z V_x} \gamma + \frac{(-l_f C_f + l_r C_r)}{I_z} \beta + \frac{l_f C_f}{I_z} \delta_f - \frac{l_r C_r}{I_z} \delta_r + \frac{1}{I_z} M_z$$ (Equation 2)

r indicates the yaw rate, $\dot{\gamma}$ indicates a velocity of the yaw rate, $\beta$ indicates a lateral slip angle, $\delta_f$ indicates a slip angle of a tire front wheel, and $\delta_r$ indicates a slip angle of a tire rear wheel.

$|C_i - \hat{C}_i| \leq F_b, (i=f,r)$ $s = \gamma - \gamma_d$ $\dot{S}_1 = \dot{\gamma} - \dot{\gamma}_d$ (Equation 3)

S indicates a surface of the sliding mode, and rd indicates the target yaw rate.

Equation 3 is an equation defining a sliding surface, that is, a yaw rate error.

$$M_z = \frac{(l_f^2 \hat{C}_f + l_r^2 \hat{C}_r)}{V_x} \gamma - (-l_f \hat{C}_f + l_r \hat{C}_r)\beta -$$

$$l_f \hat{C}_f \delta_f + l_r \hat{C}_r \delta_r + I_z \dot{\gamma}_d - k_1 \cdot sat\left(\frac{S_1}{\Phi}\right)$$

$$k_1 \geq \left|\frac{l_f^2 F_f + l_r^2 F_r}{V_x}\right| |\gamma| + |l_f F_f - l_r F_r||\beta| +$$

$$|l_f F_f||\delta_f| + |l_r F_r||\delta_r| + I_z \eta_1$$

(Equation 4)

$F_r$ indicates a rear wheel force, $F_f$ indicates a front wheel force, $k_1$ indicates a sliding mode variable.

Equation 4 shows an equation for calculating a final target yaw moment Mz using the SMC.

Figure 7:
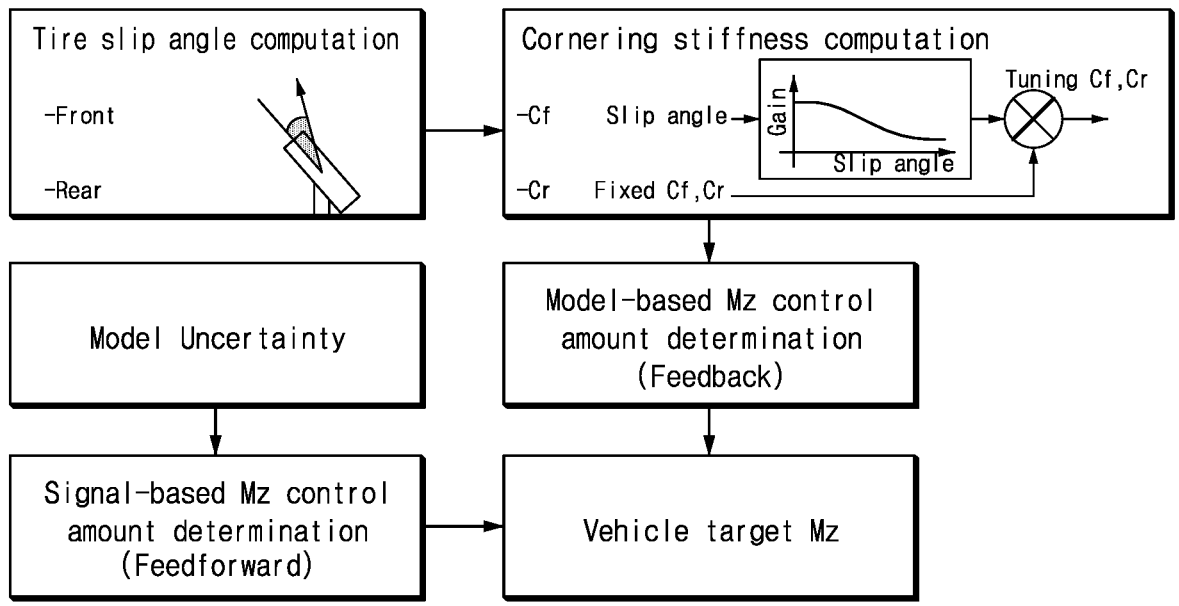
FIG. 7 illustrates a view for describing a motor control amount determining method according to an exemplary embodiment of the present disclosure.

FIG. 7 illustrates a view for describing a motor control amount determining method according to an exemplary embodiment of the present disclosure.

Referring to FIG. 7, the processor 130 may calculate the tire slip angle, calculate the cornering stiffness Cf and Cr in a linear section and then determine a model-based yaw moment control amount, may calculate a signal-based yaw moment control amount based on the cornering stiffness in a nonlinear section based on the model uncertainty, and may calculate the model-based yaw moment control amount and the signal-based yaw moment control amount, and may finally calculate the vehicle target yaw moment.

Accordingly, according to the present disclosure, a target yaw moment may be determined based on actual vehicle cornering stiffness, and vehicle target performance may be secured even in a nonlinear tire section (including a limit section).

The processor 130 may induce determination of a motor control amount for following the target yaw moment from a tire force level, unlike a conventional art.

Figure 8A:
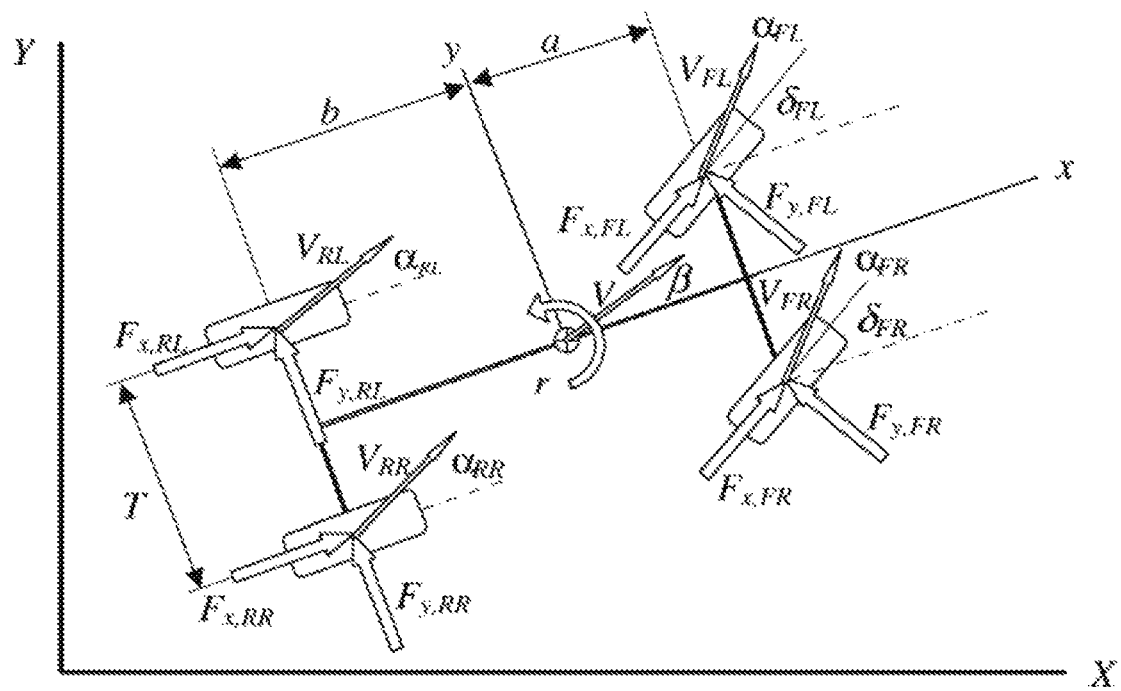
FIG. 8A illustrates an 8-DOF vehicle model according to an exemplary embodiment of the present disclosure.
Figure 8B:
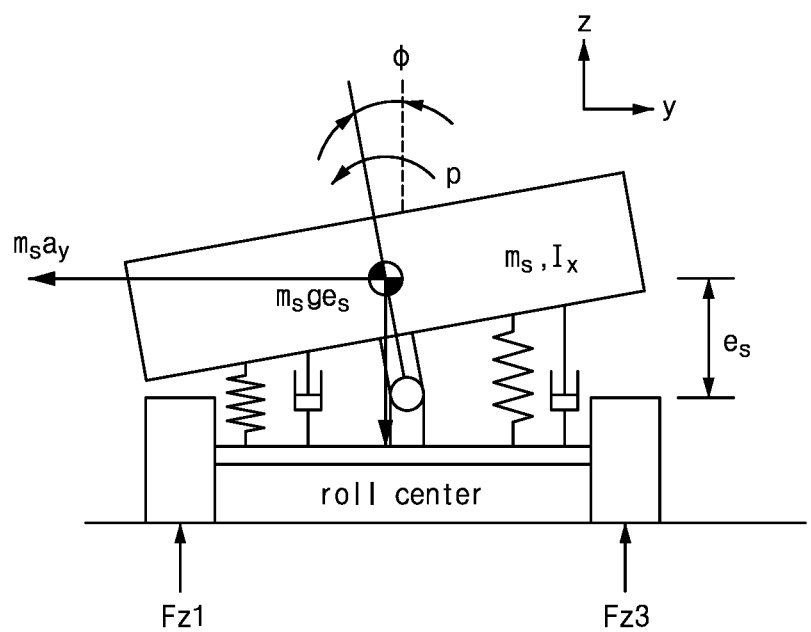
FIG. 8B illustrates a vertical force model during turning according to an exemplary embodiment of the present disclosure.

That is, the processor 130 may develop a moment term as shown in Equation 5, which is an equation based on a tire force of the vehicle model in order to implement the target yaw moment using driving motor control. In this case, the vehicle model may include an 8 degree-of-freedom vehicle model or a vertical force model when turning. FIG. 8A illustrates an 8-DOF vehicle model according to an exemplary embodiment of the present disclosure, and FIG. 8B illustrates a vertical force model during turning according to an exemplary embodiment of the present disclosure.

$$M_z = a(F_{yfl} + F_{yfr}) - b(F_{yrl} + F_{yrr}) + \frac{T}{2}[(F_{xfl} + F_{xfl}) - (F_{xfr} + F_{xrr})] \quad \text{(Equation 5)}$$

Herein, a denotes a distance of a front wheel axis from a vehicle center CG, b denotes a distance of a rear wheel axis from the vehicle center CG, and T denotes an overall width of the vehicle.

Subsequently, the processor 130 may derive a vertical force Fz of a tire from Equation 6, which is a tire and vehicle dynamics model.

$$F_{z1} = \frac{mg}{2}\left\{\frac{b}{l} - \frac{a_x}{g}\left(\frac{h}{l}\right)\right\} + K_R\left[\frac{a_y}{g}\left(\frac{h}{T}\right) - \left(\frac{m_s}{m}\right)\left(\frac{e_s}{T}\right)\sin\phi\right] \quad \text{(Equation 6)}$$

$$F_{z2} = \frac{mg}{2}\left\{\frac{a}{l} + \frac{a_x}{g}\left(\frac{h}{l}\right)\right\} + (1 - K_R)\left[\frac{a_y}{g}\left(\frac{h}{T}\right) - \left(\frac{m_s}{m}\right)\left(\frac{e_s}{T}\right)\sin\phi\right]$$

$$F_{z3} = \frac{mg}{2}\left\{\frac{b}{l} - \frac{a_x}{g}\left(\frac{h}{l}\right)\right\} - K_R\left[\frac{a_y}{g}\left(\frac{h}{T}\right) - \left(\frac{m_s}{m}\right)\left(\frac{e_s}{T}\right)\sin\phi\right]$$

$$F_{z4} = \frac{mg}{2}\left\{\frac{b}{l} + \frac{a_x}{g}\left(\frac{h}{l}\right)\right\} - (1 - K_R)\left[\frac{a_y}{g}\left(\frac{h}{T}\right) - \left(\frac{m_s}{m}\right)\left(\frac{e_s}{T}\right)\sin\phi\right]$$

Herein, m indicates total vehicle mass (including vehicle wheels and body), ms indicates a body (vehicle body) weight, ax indicates longitudinal acceleration, ay indicates lateral acceleration, l indicates a total length of the vehicle (l=lf+lr), h indicates a vehicle height, es indicates a distance from the center of gravity of the vehicle to a roll center, φ indicates a roll angle, a indicates a distance from the center of gravity of the vehicle to a center of the front wheel, which is equal to Lf in Equation 1. b indicates the distance from the center of gravity of the vehicle to a center of the rear wheel, which is equal to $L_r$ in Equation 1.

Figure 9:
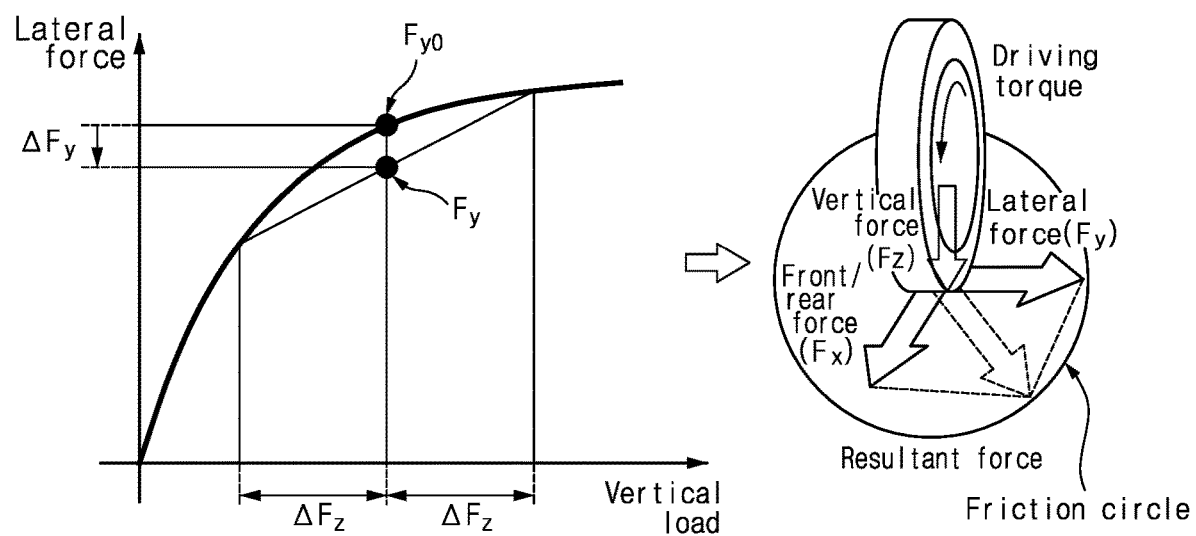
FIG. 9 illustrates a view for describing a tire vertical force, a tire lateral force, and a tire driving torque according to an exemplary embodiment of the present disclosure.

As illustrated in FIG. 9, the processor 130 derives a tire lateral force Fy as illustrated in Equation 7, and derives a tire driving torque Fx as illustrated in Equation 8. FIG. 9 illustrates a view for describing a tire vertical force, a tire lateral force, and a tire driving torque according to an exemplary embodiment of the present disclosure.

$$F_y = C\alpha\left[1 - k_1\left(\frac{F_Z}{mg}\right)^2\right] \quad \text{(Equation 7)}$$

C indicates an average value of a sum of cr and cf, but Equation 7 may be applied to each of the rear and front wheels.

$$\mu \geq \frac{\sqrt{F_x^2 + F_y^2}}{F_z} \quad \text{(Equation 8)}$$

That is, the processor 130 may estimate a margin of Fx, and may calculate a target Fx.

That is, the processor 130 may calculate a vertical force Fz of each tire through Equation 6, may calculate a tire lateral force Fy through Equation 7, and may calculate a tire driving torque Fx through Equation 8.

Accordingly, the processor 130 may determine a driving motor control amount P for following target yaw moments Fz1, Fz2, Fz3, and Fz4 based on the tire force as illustrated in Equation 9.

$$P = T_m\omega_m = F_xV \quad \text{(Equation 9)}$$

$$T_m = \frac{F_xV}{\omega_m}$$

Herein, Tm indicates a motor torque, wm indicates a rotational speed of the motor, Fx indicates a tire driving torque, and V indicates a vehicle speed. Accordingly, the motor torque Tm, which is a motor control amount, may be calculated as a value obtained by dividing a product of the driving torque and the vehicle speed by the rotational speed of the motor. In this case, the vehicle speed and the rotational speed of the motor may be received from an in-vehicle device, or may be obtained through a sensor.

Figure 10:
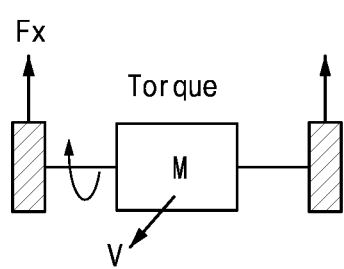
FIG. 10 illustrates a view for describing a motor control amount determining method according to an exemplary embodiment of the present disclosure.

FIG. 10 illustrates a view for describing a driving motor control amount determining method according to an exemplary embodiment of the present disclosure. Referring to FIG. 10, V denotes a motor speed and Fx denotes a tire driving torque.

The processor 130 may allocate a motor control amount depending on 2WD (1-Motor) and 4WD (2-Motor or more) types.

Figure 11:
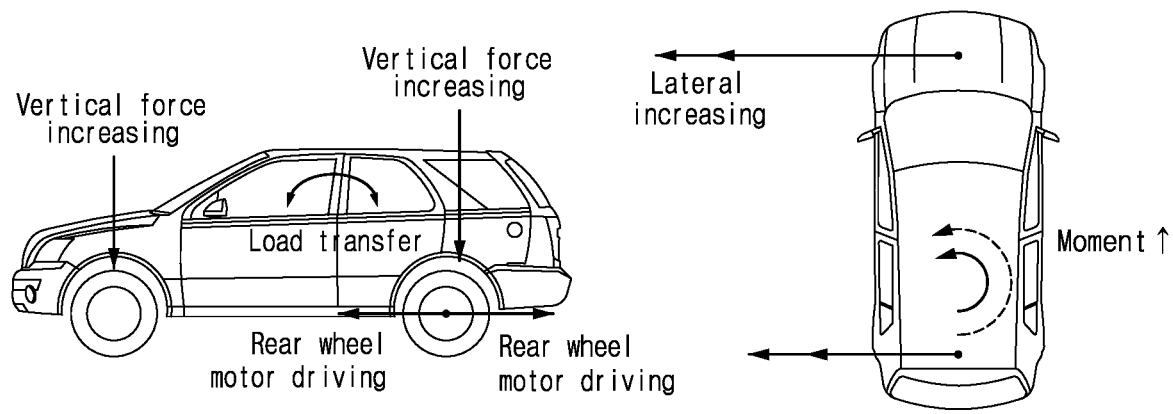
FIG. 11 illustrates a view for describing a motor control amount determining method of a two-wheel drive vehicle according to an exemplary embodiment of the present disclosure.
Figure 12:
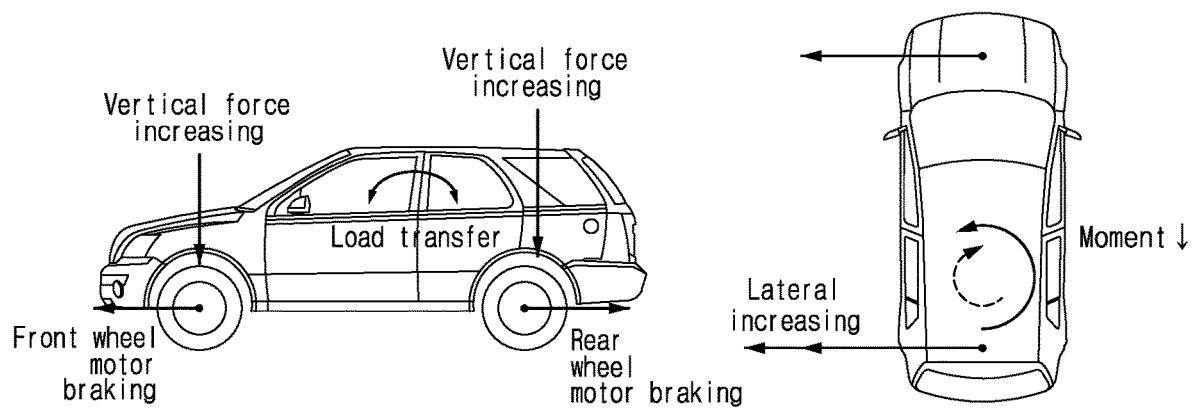
FIG. 12 illustrates a view for describing a motor control amount determining method of a four-wheel drive vehicle according to an exemplary embodiment of the present disclosure.

FIG. 11 illustrates a view for describing a driving motor control amount determining method of a two-wheel drive vehicle according to an exemplary embodiment of the present disclosure, and FIG. 12 illustrates a view for describing a driving motor control amount determining method of a four-wheel drive vehicle according to an exemplary embodiment of the present disclosure.

Figure 13:
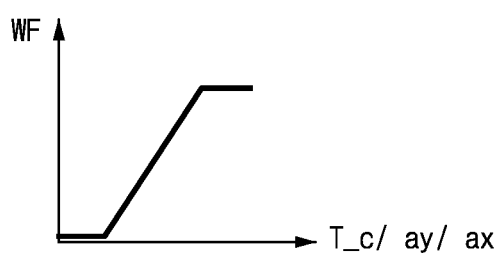
FIG. 13 illustrates a view for describing a motor control amount determining method of a four-wheel drive vehicle according to an exemplary embodiment of the present disclosure.

FIG. 13 illustrates a view for describing a driving motor control amount determining method of a four-wheel drive vehicle according to an exemplary embodiment of the present disclosure.

Referring to FIG. 11, in the case of a two-wheel drive vehicle, a control target amount may be followed by a single motor. In other words, when understeering, braking control of a single motor is performed to improve a front wheel grip force, and when oversteering, driving control of a single motor is performed to improve a rear wheel grip force.

Referring to FIG. 12, in the case of a four-wheel drive vehicle, control amounts of the front wheel motor and the rear wheel motor depending on the under-steer index and the over-steer index may be followed. That is, the processor 130 may improve the front wheel grip force by performing braking control with the rear wheel motor based on the understeer, and may stabilize a vehicle body behavior by performing driving control with a front wheel motor. In addition, the processor 130 may improve the rear wheel grip force by performing driving control with the front wheel motor based on the over-steer index, and may stabilize the vehicle body behavior by performing braking control with the rear wheel motor.

The processor 130 may determine the motor control amount for stabilizing the vehicle body by multiplying the motor control amount T_c for the target yaw moment by a weight factor, as shown in Equation 10. Referring to FIG. 13, a weight WF may reflect a yaw control motor control amount, vertical acceleration ax, which is a control factor for pitch performance, and lateral acceleration ay, which is a control factor for roll performance.

Vehicle body stabilization motor control amount=motor control amount for target yaw moment $T\_c$*weight factor.  (Equation 10)

The sensing device 200 may sense a vehicle speed, a steering angle, a lateral jerk, a yaw rate, and a lateral slip angle, and may provide them to the vehicle motor control device 100.

To this end, the sensing device 200 may include a vehicle speed sensor, a steering angle sensor, and a lateral jerk sensor.

Figure 14:
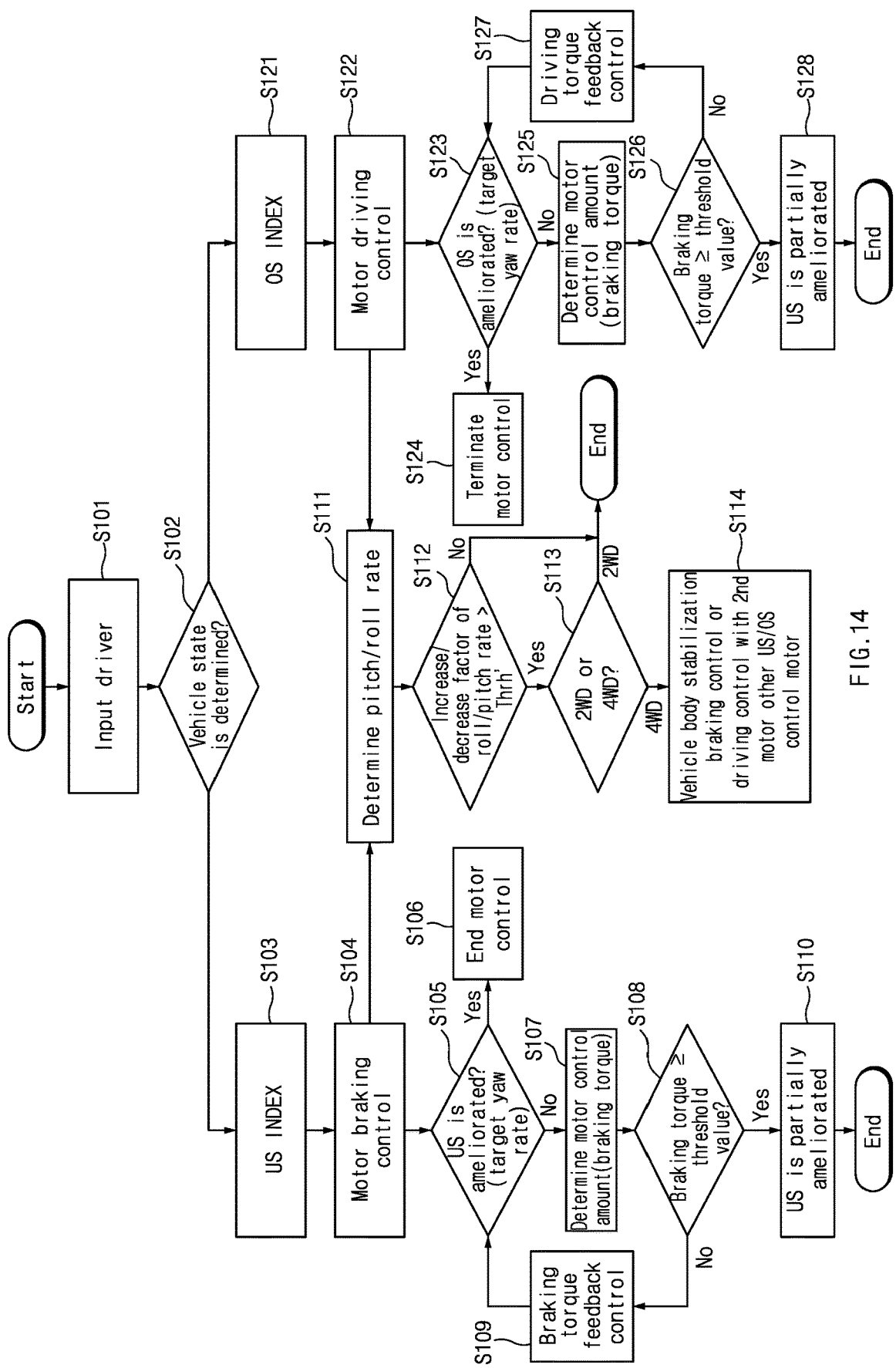
FIG. 14 illustrates a flowchart showing a vehicle motor control method according to an exemplary embodiment of the present disclosure.

Hereinafter, a vehicle motor control method according to an exemplary embodiment of the present disclosure will be described in detail with reference to FIG. 14. FIG. 14 illustrates a flowchart showing a vehicle motor control method according to an exemplary embodiment of the present disclosure.

Hereinafter, it is assumed that the vehicle motor control apparatus 100 of the of FIG. 1 performs processes of FIG. 14. In addition, in the description of FIG. 14, operations described as being performed by a device may be understood as being controlled by the processor 130 of the vehicle motor control apparatus 100.

Referring to FIG. 14, the vehicle motor control apparatus 100 determines whether a vehicle state is an under-steer state or an over-steer state. That is, the vehicle motor control apparatus 100 calculates an under-steer index and an over-steer index of the vehicle based on at least one of a vehicle speed, a steering angle, a lateral jerk, a yaw rate, and a lateral slip angle.

Specifically, the vehicle motor control apparatus 100 may calculate a target yaw rate using the vehicle speed, steering angle, etc., and may calculate the under-steer index and the over-steer index by combining a yaw rate error value, which is a difference between a target yaw rate and a current yaw rate, and a front wheel lateral slip angle, and a rear wheel lateral slip angle. Subsequently, the vehicle motor control apparatus 100 determines that it is in an under-steer state when the under-steer index exceeds a predetermined threshold value, and determines that it is in an over-steer state when the over-steer index exceeds a predetermined threshold value. In this case, the threshold values may be determined in advance by experimental values.

When the vehicle is in the under-steer (US) state (S103), the vehicle motor control apparatus 100 performs motor braking control (S104).

The vehicle motor control apparatus 100 determines whether the understeer is ameliorated by the motor braking control (S105), and when the understeer is ameliorated, terminates the motor control (S106).

On the other hand, when understeer is not ameliorated, a motor control amount is determined for braking torque feedback (S109). That is, the vehicle motor control apparatus 100 may calculate a target yaw moment using the under-steer index and may calculate a motor control amount based on a tire force.

Subsequently, the vehicle motor control apparatus 100 determines whether the motor control amount (braking torque) is greater than or equal to a predetermined threshold value (S108), and when it is less than the threshold value, performs braking torque feedback control (S109). That is, the vehicle motor control apparatus 100 performs braking control of the motor based on the braking torque determined in step S107. In this case, a braking torque limit value indicates a maximum torque that a user does not feel different from, and may be determined in advance by an experimental value. Accordingly, the vehicle motor control apparatus 100 may repeatedly perform the processes S105 to S109 until the understeer is ameliorated.

On the other hand, when the braking torque is equal to or greater than a predetermined threshold value, the braking torque feedback control is no longer performed and the motor control is terminated in a state where the understeer is partially ameliorated (S110).

Meanwhile, the vehicle motor control apparatus 100 may perform steps S111 to S114 for stabilizing the vehicle body in parallel with a process of performing the above steps S104 to S110.

First, the vehicle motor control apparatus 100 may determine a roll/pitch rate depending on braking control of the rear wheel motor (S111), may determine whether an increase/decrease factor of the roll/pitch rate is greater than a threshold value Thrh' (S112), may determine whether the vehicle is a single motor vehicle (2WD) or a multiple motor vehicle (4WD) (S113) when the increase/decrease factor of the roll/pitch rate is greater than the threshold value, and may terminate motor control when it is the single motor vehicle and may perform the motor control for vehicle body stabilization with the second motor other than the first motor provided for ameliorating the understeer when it is the multiple motor vehicle (S114).

On the other hand, when the vehicle state is the over-steer (OS) state in step S101 (S121), motor driving control is performed (S122).

Subsequently, the vehicle motor control apparatus 100 determines whether the oversteer is ameliorated (S123), and when the oversteer is ameliorated, terminates the motor control (S124).

On the other hand, when the oversteer is not ameliorated, the vehicle motor control apparatus 100 determines a motor control amount (driving torque) (S125).

The vehicle motor control apparatus 100 determines whether the determined driving torque is greater than or equal to a predetermined threshold value (S126), and performs driving torque feedback control when the determined driving torque is smaller than the threshold value (S126). That is, the vehicle motor control apparatus 100 performs driving control of the motor based on the determined driving torque (S127). In this case, the threshold value of the driving torque indicates a maximum torque that a user does not feel different from, and may be determined in advance by an experimental value.

On the other hand, when the determined driving torque is greater than or equal to the threshold value, the vehicle motor control apparatus 100 does not perform driving torque feedback control and partially ameliorates the oversteer and terminates it (S128).

In addition, the vehicle motor control apparatus 100 may perform steps S111 to S114 for stabilizing the vehicle body in parallel with a process of performing the above steps S121 to S114.

First, the vehicle motor control apparatus 100 may determine a roll/pitch rate depending on driving control of the front wheel motor (S111), may determine whether an increase/decrease factor of the roll/pitch rate is greater than a threshold value Thrh' (S112), may determine whether the vehicle is a single motor vehicle (2WD) or a multiple motor vehicle (4WD) (S113) when the increase/decrease factor of the roll/pitch rate is greater than the threshold value, and may terminate motor control when it is the single motor vehicle and may perform the motor control for vehicle body stabilization with the second motor other than the first motor provided for ameliorating the understeer when it is the multiple motor vehicle (S114).

As such, according to the present disclosure, turning responsiveness and stability may be improved by torque control of the front and rear motors for each turning situation and each turning phase by determining the motor control amount by calculating the target yaw rate when a turning motion of a motorized vehicle is improved.

In addition, according to the present disclosure, turning agility and stability may be controlled at the same time by controlling the motor by calculating a target yaw moment based on the cornering stiffness and calculating a motor control amount that satisfies the calculated tire force.

Figure 15:
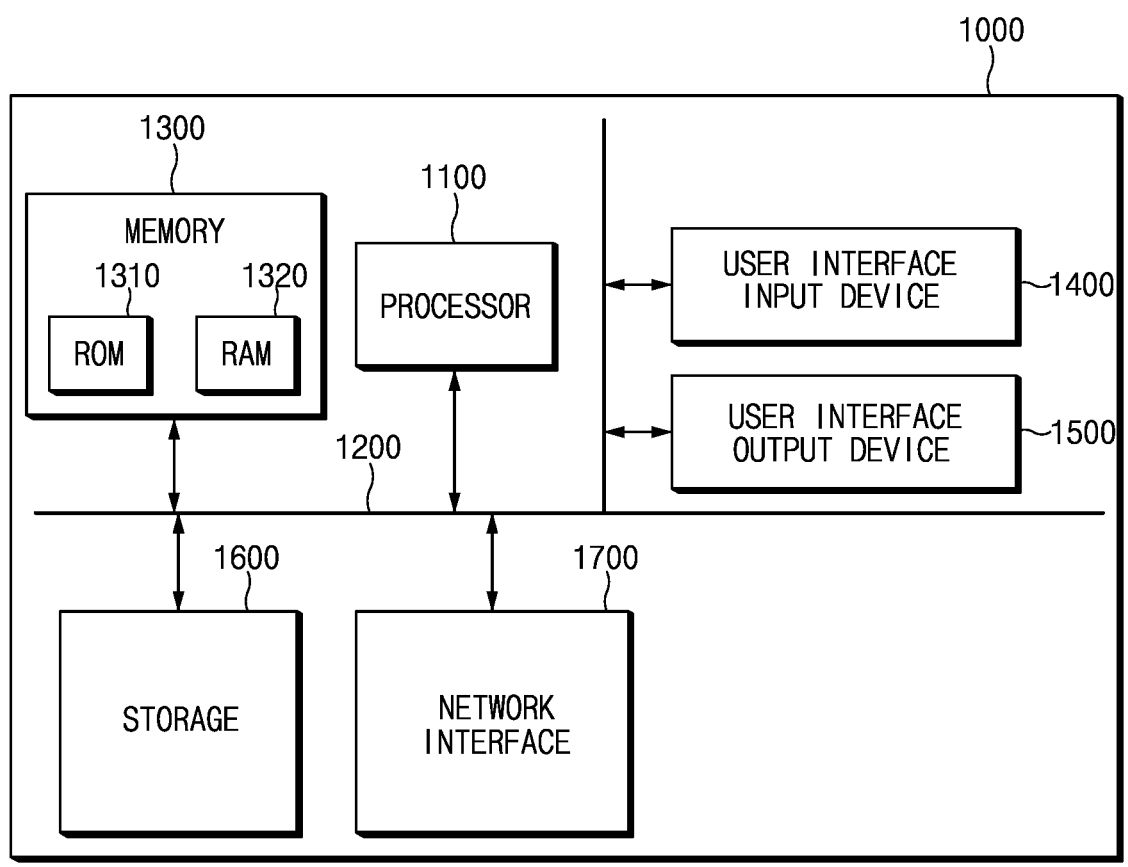
FIG. 15 illustrates a computing system according to an exemplary embodiment of the present disclosure.

FIG. 15 illustrates a computing system according to an exemplary embodiment of the present disclosure.

Referring to FIG. 15, the computing system 1000 includes at least one processor 1100 connected through a bus 1200, a memory 1300, a user interface input device 1400, a user interface output device 1500, and a storage 1600, and a network interface 1700.

The processor 1100 may be a central processing unit (CPU) or a semiconductor device that performs processing on commands stored in the memory 1300 and/or the storage 1600. The memory 1300 and the storage 1600 may include various types of volatile or nonvolatile storage media. For example, the memory 1300 may include a read only memory (ROM) and a random access memory (RAM).

Accordingly, steps of a method or algorithm described in connection with the exemplary embodiments disclosed herein may be directly implemented by hardware, a software module, or a combination of the two, executed by the processor 1100. The software module may reside in a storage medium (i.e., the memory 1300 and/or the storage 1600) such as a RAM memory, a flash memory, a ROM memory, an EPROM memory, an EEPROM memory, a register, a hard disk, a removable disk, and a CD-ROM.

An exemplary storage medium is coupled to the processor 1100, which can read information from and write information to the storage medium. Alternatively, the storage medium may be integrated with the processor 1100. The processor and the storage medium may reside within an application specific integrated circuit (ASIC). The ASIC may reside within a user terminal. Alternatively, the processor and the storage medium may reside as separate components within the user terminal.

The above description is merely illustrative of the technical idea of the present disclosure, and those skilled in the art to which the present disclosure pertains may make various modifications and variations without departing from the essential characteristics of the present disclosure.

Therefore, the exemplary embodiments disclosed in the present disclosure are not intended to limit the technical ideas of the present disclosure, but to explain them, and the scope of the technical ideas of the present disclosure is not limited by these exemplary embodiments. The protection range of the present disclosure should be interpreted by the claims below, and all technical ideas within the equivalent range should be interpreted as being included in the scope of the present disclosure.

What is claimed is:

1. A vehicle motor control apparatus for a vehicle comprising:
    a processor configured to:
        determine whether a state of the vehicle is an over-steer state or an under-steer state,
        determine a driving control mode or a braking control mode of a motor based on a determination result of the state of the vehicle,
        calculate a target yaw moment of based on a tire force by using the over-steer state or the under-steer state, and
        determine a motor control amount that follows the target yaw moment; and
    a memory configured to store data and algorithms driven by the processor,
    wherein the processor is configured to:
    perform the braking control mode, in response to a determination that the state of the vehicle is the under-steer state,
    calculate the target yaw moment based on the tire force using an understeer index, in response to a determination that the understeer state is not improved, after the performing of the braking control mode,
    perform the driving control mode, in response to a determination that the state of the vehicle is the oversteer state,
    calculate the target yaw moment based on the tire force using an oversteer index, in response to a determination that the oversteer state is not improved, after the performing of the driving control mode,
    calculate a target yaw rate based on a vehicle speed and a steering angle,
    calculate an under-steer index or an over-steer index by combining a yaw rate error value, which is a difference between the target yaw rate and a current yaw rate, and a front wheel lateral slip angle and a rear wheel lateral slip angle,
    calculate a weight factor reflecting a driver's turning will and a driving road surface condition, and
    correct the under-steer index and the over-steer index of the vehicle by using the weight factor.

2. The vehicle motor control apparatus of claim 1, wherein the processor
    determines the state of the vehicle based on at least one of a vehicle speed, a steering angle, a lateral jerk, a yaw rate, or a lateral slip angle.

3. The vehicle motor control apparatus of claim 1, wherein, when the vehicle includes a single motor, the processor performs driving control or braking control of a single motor depending on the target yaw moment.

4. The vehicle motor control apparatus of claim 1, wherein the processor, when the vehicle includes at least two or more motors, performs driving control or braking control of a first motor depending on the target yaw moment, and
performs driving control or braking control of a second motor by using a roll state amount and a pitch state amount.

5. The vehicle motor control apparatus of claim 1, wherein the processor performs braking control of a rear wheel motor when the state of the vehicle is the under-steer state and performs driving control of a front wheel motor when a pitch rate and a roll rate exceed a predetermined threshold value.

6. The vehicle motor control apparatus of claim 1, wherein the processor performs driving control of a front wheel motor when the state of the vehicle is the over-steer state, and
performs braking control of a rear wheel motor when a pitch and roll rate exceed a predetermined threshold value.

7. The vehicle motor control apparatus of claim 1, wherein the processor calculates the target yaw moment for a yaw rate error by using a bicycle model and a sliding mode control (SMC), and
calculates the target yaw moment based on a cornering stiffness that is available in a general driving area and a limit area, which is a tire nonlinear section.

8. The vehicle motor control apparatus of claim 1, wherein the processor
develops the target yaw moment as a formula based on a tire force of a vehicle model,
calculates a vertical force of each tire based on a vehicle dynamics model,
calculates a tire lateral force by using the vertical force of each of the tires, and
calculates a tire driving torque based on the tire lateral force.

9. The vehicle motor control apparatus of claim 8, wherein the processor calculates the motor control amount by using the tire driving torque, a motor rotational speed, and a vehicle speed.

10. The vehicle motor control apparatus of claim 9, wherein the processor determines the motor control amount by computing a weight reflecting the motor control amount, vertical acceleration, which is a control factor of pitch performance, and lateral acceleration, which is a control factor of roll performance, with the target yaw moment.

11. A vehicle motor control method comprising:
determining whether a state of a vehicle is an over-steer state or an under-steer state;
determining whether a control mode of a motor is a driving control mode or a braking control mode of a motor based on a determination result of the state of the vehicle;
controlling the motor based on a determination result of the control mode;
calculating a target yaw moment based on a tire force by using the over-steer state or the under-steer state; and
determining a motor control amount that follows the target yaw moment
wherein the determining whether a control mode of a motor is a driving control mode or a braking control mode of a motor based on a determination result of the state of the vehicle including:
performing the braking control mode, in response to a determination that the state of the vehicle is the under-steer state, and
performs the driving control mode, in response to a determination that the state of the vehicle is the over-steer state,
wherein the calculating a target yaw moment based on a tire force by using the over-steer state or the under-steer state including:
calculating the target yaw moment based on the tire force using an understeer index, in response to a determination that the understeer state is not improved, after the performing of the braking control mode, and
calculating the target yaw moment based on the tire force using an oversteer index, in response to a determination that the oversteer state is not improved, after the performing of the driving control mode,
wherein the determining whether the state of the vehicle is the over-steer state or the under-steer state includes:
calculating a target yaw rate based on the vehicle speed and the steering angle; and
calculating an under-steer index or an over-steer index by combining a yaw rate error value, which is a difference between the target yaw rate and a current yaw rate, and a front wheel lateral slip angle and a rear wheel lateral slip angle,
calculating a weight factor reflecting a driver's turning will and a driving road surface condition, and
correcting the under-steer index and the over-steer index of the vehicle by using the weight factor.

12. The vehicle motor control method of claim 11, wherein the controlling of the motor includes, when the vehicle includes a single motor, performing driving control or braking control of a single motor depending on the target yaw moment.

13. The vehicle motor control method of claim 11, wherein the controlling of the motor includes, when the vehicle includes at least two or more motors:
performing driving control or braking control of a first motor depending on the target yaw moment; and
performing driving control or braking control of a second motor by using a roll state amount and a pitch state amount.

14. The vehicle motor control method of claim 11, wherein the controlling of the motor includes:
performing braking control of a rear wheel motor upon determining that the state of the vehicle is the under-steer state; and
performing driving control of a front wheel motor when a pitch and roll rate exceed a predetermined threshold value.

15. The vehicle motor control method of claim 11, wherein the controlling of the motor includes:
performing driving control of a front wheel motor when the state of the vehicle is the over-steer state; and
performing braking control of a rear wheel motor when a pitch and roll rate exceed a predetermined threshold value.

16. The vehicle motor control method of claim 11, wherein the calculating of the target yaw moment based on the tire force includes:
developing the target yaw moment as a formula based on a tire force of a vehicle model;
calculating a vertical force of each tire based on a vehicle dynamics model;
calculating a tire lateral force by using the vertical force of each of the tires; and
calculating a tire driving torque based on the tire lateral force.

17. The vehicle motor control method of claim 16, wherein the determining of the motor control amount that follows the target yaw moment includes calculating the motor control amount by using the tire driving torque, a motor rotational speed, and a vehicle speed.

18. The vehicle motor control method of claim 11, wherein the determining of the motor control amount that follows the target yaw moment includes determining the motor control amount by computing a weight reflecting the motor control amount, vertical acceleration, which is a control factor of pitch performance, and lateral acceleration, which is a control factor of roll performance, with the target yaw moment.

\* \* \* \* \*